Nov. 13, 1928.

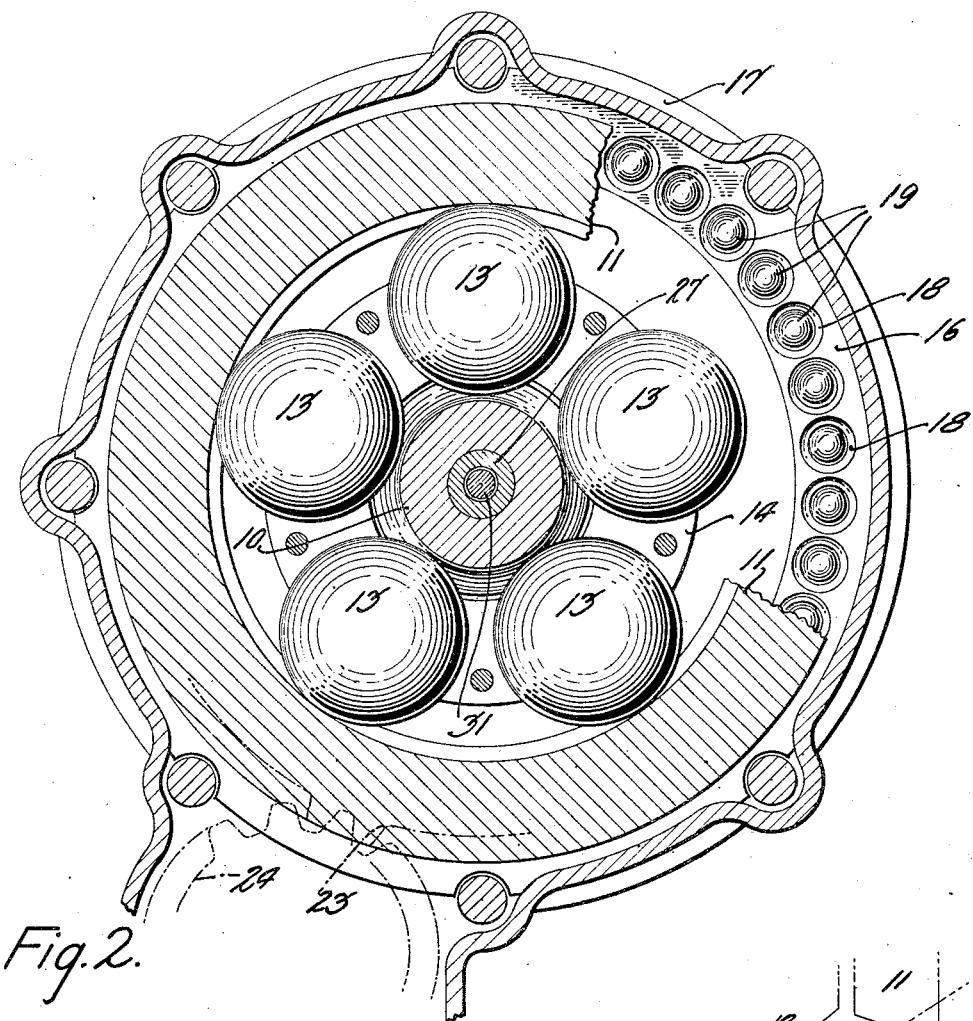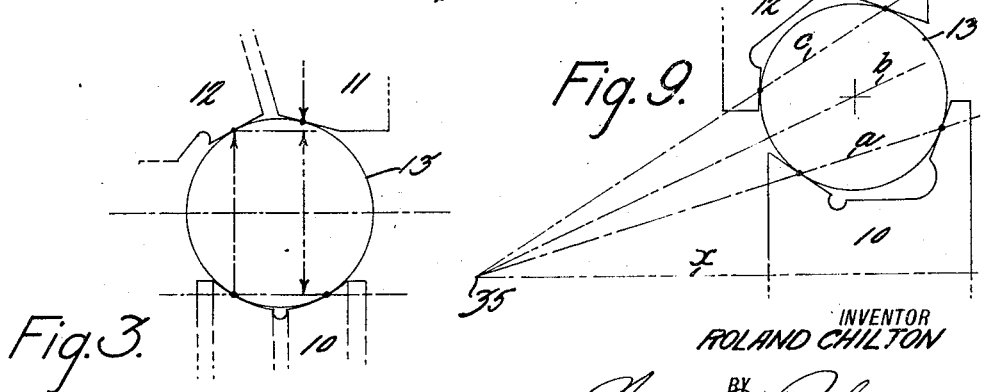

R. CHILTON

FRICTION TRANSMISSION

Filed May 26, 1926  4 Sheets-Sheet 3

1,691,625

INVENTOR
ROLAND CHILTON
BY
ATTORNEY

Nov. 13, 1928.　　　　　　　　　　　　　　　　　1,691,625
R. CHILTON
FRICTION TRANSMISSION
Filed May 26, 1926　　　4 Sheets-Sheet 4

INVENTOR
ROLAND CHILTON

Patented Nov. 13, 1928.

1,691,625

UNITED STATES PATENT OFFICE.

ROLAND CHILTON, OF KEYPORT, NEW JERSEY, ASSIGNOR, BY MESNE ASSIGNMENTS, TO AEROMARINE STARTER COMPANY, INC., A CORPORATION OF NEW YORK.

FRICTION TRANSMISSION.

Application filed May 26, 1926. Serial No. 111,761.

This invention relates to mechanism for the transmission of power by rotary members in rolling contact under pressures adapted to prevent slippage.

Mechanisms of this class are commonly referred to as "friction gears" since the drive is transmitted by the frictional resistance of the rolling surfaces to slippage, although the rolling action itself is relatively frictionless as regards transmissive efficiency.

The invention is intended to be of general application for the transmission of rotary power and one of the important objects is to provide a compact mechanism suited for a wide range of speed ratios including the unity and zero conditions.

The extreme cases of zero ratio, (reciprocally infinite ratio), wherein one member may rotate at any speed, whilst holding the other stationary, is unobtainable in conventional gears where the speed ratio is equal to the diameter ratio of the rolling or pitch circles of the co-acting members, which diameters cannot in practice have infinite or zero size,—although the latter has been proposed in friction gears by bringing one friction disc to contact with the center of another, which tends to destructive spinning at the contact surfaces. Compound step-up and step-down gears and positive and negative drive gears, inter-connected by differential means, may be used to overcome this defect, but one of the principal objects of the present invention is to achieve these ends by a simple, single step-gear having only one set of planet means.

As will be more fully described later, the present invention includes a set of planetary means having rolling contact with each of two concentric pairs of co-acting members, the drive ratio being proportionate to the difference in diameter of the rolling circles. When the parts are organized for equal diameter of the rolling paths (zero difference) zero ratio is obtained by fixing one of the members while unity ratio may be obtained by organizing one member as the driver and the other as the driven element. Thus wide extremes of ratio may be obtained without increasing the weight or bulk of the parts from that appropriate to the desired power capacity.

Another object is to provide a gear wherein the ratio may be controlled through a wide range including the zero condition, by small movements of the drive members without directly engaging the planet means individually or as a whole, by the control means. Where external or manual control is desired such small movements of the controlled members are specially desirable because they permit the use of powerful leverage to overcome the control resistance without inconvenient hand movement or pressure. An associated object is to provide a balanced condition of the contact pressure reactions between the controlled members.

Further objects are to permit the planet means to freely follow their natural axes of spin as imposed by their contact with the drive members, and to avoid all restraint to the planetary motion, as from planet guides or drive cages, and to have the planets located and receive reactions only from the members which they drivably connect by rolling contact. Thus the planet spacer in this invention is merely a floating separating device and transmits no driving or control forces.

Objects of the preferred embodiment are to provide transmission means wherein the ratio shall automatically approach the zero condition as the load approaches a preset maximum whereby the mechanism is protected from overload, and to provide means for automatically increasing the mechanical advantage up to a preset limit as the resistance encountered increases.

Another object is to provide a toothless transmission of large capacity relative to the size and bulk of the parts and to this end hardened rolling members and high contact pressures, as used in anti-friction bearing practice are preferred.

Another object is to avoid high bearing loads from such high contact pressures and to this end there is featured a planetary disposition wherein the pressures are in the main balanced within the drive members themselves leaving a small external reaction which may be readily taken by a single bearing means.

Drive load responsive contact pressure means are included in this invention so that the contact pressure is always proportionately in excess of the slipping tendency due to the load transmitted, and hence the objective of pure rolling contact, to the exclusion of all sliding is realized under all loads. This is especially important for durability under the high specific contact loads here contemplated and in the simple fixed ratio form of this invention, which is not inherently protected from overload, a preset clutch capable of slipping without damage, is included in order to protect the rolling surfaces against excessive contact pressures, from excessive driving loads.

Although the rolling friction is but a small fraction of the resistance to sliding under the same contact pressures, yet the former may reach an appreciable amount which would detract from the efficiency if high contact pressures are present at light loads, as is the case with preset contact pressure means. The torque responsive contact pressure means, however, tends to a constant percentage of efficiency at all loads.

For the purposes of this disclosure, the invention is shown embodied in a flywheel type engine starter, as illustrating an application where the foregoing objectives are desired.

For simplicity of explanation, the invention is first shown (Figs. 1, 2, 6 and 7) in a non-variable form wherein the parts are permanently organized for a set speed ratio. Unlike the preferred or variable form later described, this fixed ratio gear is not inherently protected from overload and there is accordingly included in the showing an overload release clutch.

In the drawings:

Figure 2 is a transverse section taken on the line 2 of Fig. 1 looking in the direction indicated by the arrow.

Figure 3 is a fragmentary line diagram of the principal elements shown in Fig. 1 and illustrating the points of contact between the frictionally engaged surfaces.

Figure 9 is a line diagram similar to the Fig. 3 showing an alternative disposition of the principal elements of the invention.

Figure 1:
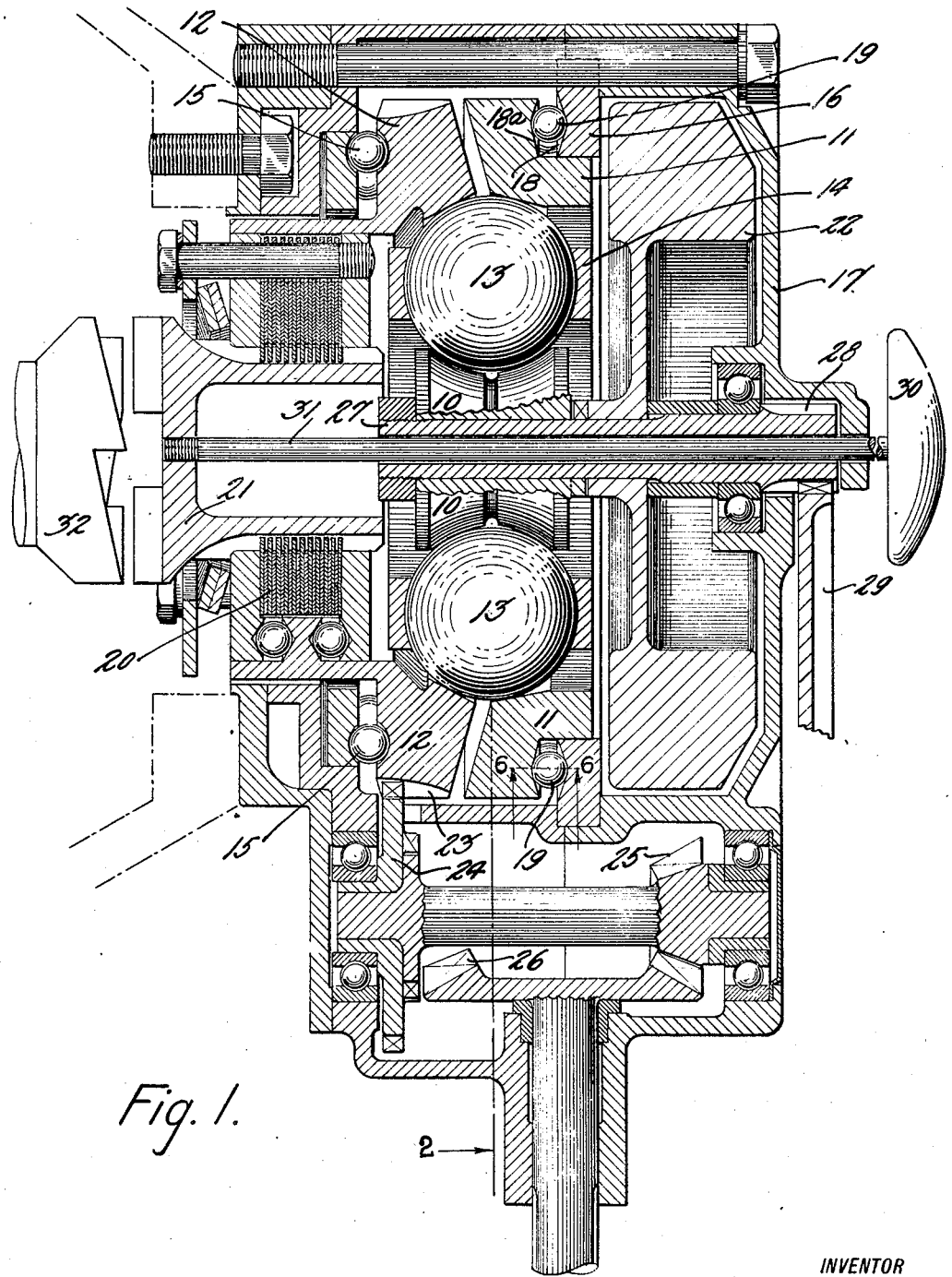
Figure 1 is a vertical longitudinal section of one form of the invention having a fixed speed ratio.

Referring to Fig. 1. 10 represents a driving friction member, 11 a concentric friction member restrained from rotation, and 12 a driven friction member, all having rolling contact with planet means 13. As will be seen more clearly from the line diagram of Fig. 3 each planet 13 has spaced apart points of contact with the driving member 10 whereby the axis of rotation of each planet is determined. Should the contact circles of the planets on the fixed and driven members 11, 12 occur at the same radii, the members will be constrained to zero speed difference, in other words, there would be no progression of the driven member 12 regardless of the speed of the driving member 10, which condition is here referred to as zero (reciprocally infinite) ratio.

In the actual showing of Figs. 1 and 3, the planets contact with the fixed member 11 and the driven member 12 on different diameter rolling circles and the speed of the driven member relative the driving member is proportional to the difference in these contact circle diameters. With the proportion shown, the contact path of the driven member 12 is of smaller radius than on the fixed member 11 and under these conditions the driven member will rotate, at reduced speed, in the same direction as the driving member. On the other hand, should the contact diameter on the driven member be made greater than on the fixed member, then the driven member will turn in the reversed direction to the driving member.

Due to the axial separation of the respective contact points of the planets 13 with the driven and fixed members, the driving force tends to spin the planets about radial axes and it is a feature of this invention that this spinning tendency is resisted by widely spaced contact points with the driving member 10, whereby planet bearings and supporting structure are eliminated, the planets being free to follow the natural axes of spin imparted by their rolling contact with the drive member. A rotationally free spacer 14 is used to keep the planets equi-distant, but is free of all driving load.

It will be seen that with the preferred spherical planets shown, the diameters of the paths of rolling contact depend upon the relative angularity of the planet engaged surfaces of the members and that with the proportions shown, the angularity of these contact faces is relatively slight and hence the end reactions or separating tendency between the fixed and driven members is correspondingly small and may be conveniently taken by an anti-friction thrust bearing 15.

Figures 5, 6, 7:
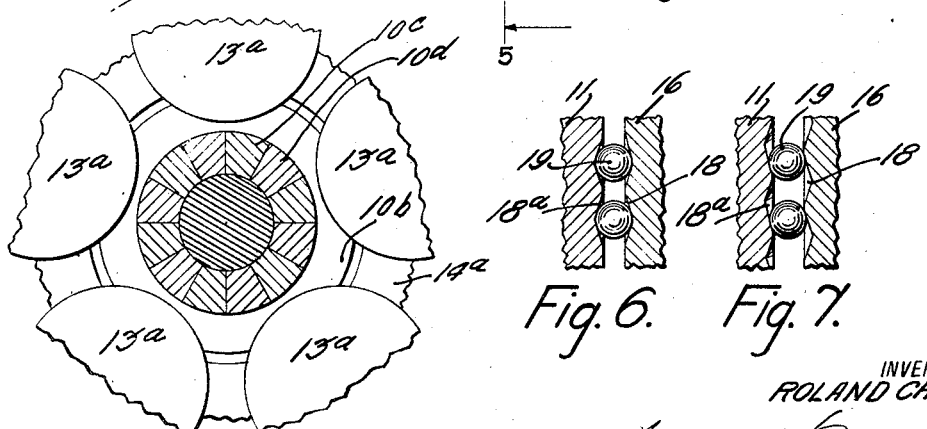
Figure 5 is a fragmentary transverse section taken on the line 5—5 of Fig. 4 as looking in the direction indicated by the arrows, and shows the drive connection between the parts of the drive member.
Figure 6 is a fragmentary sectional view taken on the line 6 of Figure 1 or 4 as looking in the direction indicated by the arrows and illustrates in detail the torque-responsive contact pressure means in the high speed position.
Figure 7 is a sectional view similar to Fig. 6 illustrating the movement of the parts towards the zero ratio position.

The turning tendency on the anchored member 11 is proportional to the load transmitted and there is shown in developed view in Figs. 6 and 7, torque responsive anchor means for this member whereby the contact pressures between the co-acting drive members are always maintained proportionally in excess of the slipping tendency due to the load transmitted. This torque responsive means comprises a plate 16 securely fixed to the stationary housing 17 and provided with a plurality of conical pockets 18. Corresponding pockets $18^a$ are formed in the anchored member 11 and balls 19 are disposed between the members in these pockets. It will be seen that by means of these balls and inclined pockets the rotational tendency of the member 11 is translated into proportionate axial forces which maintain all the drive members in rolling contact with the planets. The slope of the angular pockets is so proportioned with respect to the coefficient of friction of the rolling surfaces and the angularity of the roll tracks that the resistance to sliding due to the resulting contact pressures shall always be in excess of the tendency to sliding due to the driving load, and thus slipping is prevented even under excessive loads.

To prevent excessive contact pressures from such loads damaging the rolling surfaces, a friction clutch 20 preferably of the type disclosed in my co-pending application Ser. No. 106,905, filed May 5th, 1926, adapted to slip at a preset load, is interposed between the driven member 12 and the member driven therefrom which in the specific showing comprises an engine engaging jaw 21. In this embodiment a flywheel 22 may be pre-energized from a low speed source through the friction drive of this invention, for which purpose the drive member 12 thereof is provided with external teeth 23 engaged by a gear 24 and in the case where transverse operation, as by a handcrank is desired, the bevel gears 25 and 26 are included.

For connection of the driving member 10 to a source of power a drive shaft 27 is extended from the casing and a pinion 28 is illustrated as the connecting means with a power gear 29.

A handle 30 and the rod 31 comprise a control means for connecting the driven friction member 12 through the jaw clutch 21 with the means to be driven, which in this specific embodiment comprises an engine crankshaft having a jaw 32 with which connection is made, after the flywheel has been brought to high speed, overloads being suppressed by the slipping of the clutch 20.

Figure 4:
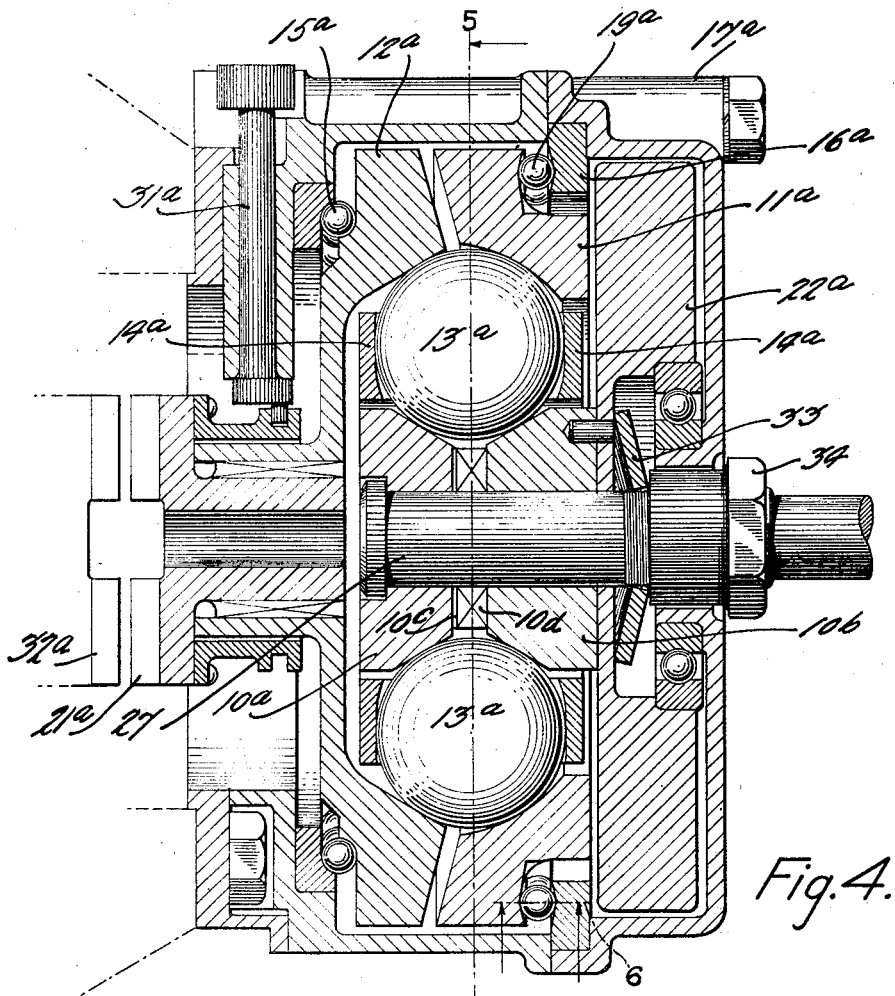
Figure 4 is a vertical longitudinal section of the preferred form of the invention having a variable speed ratio.
Figure 8:
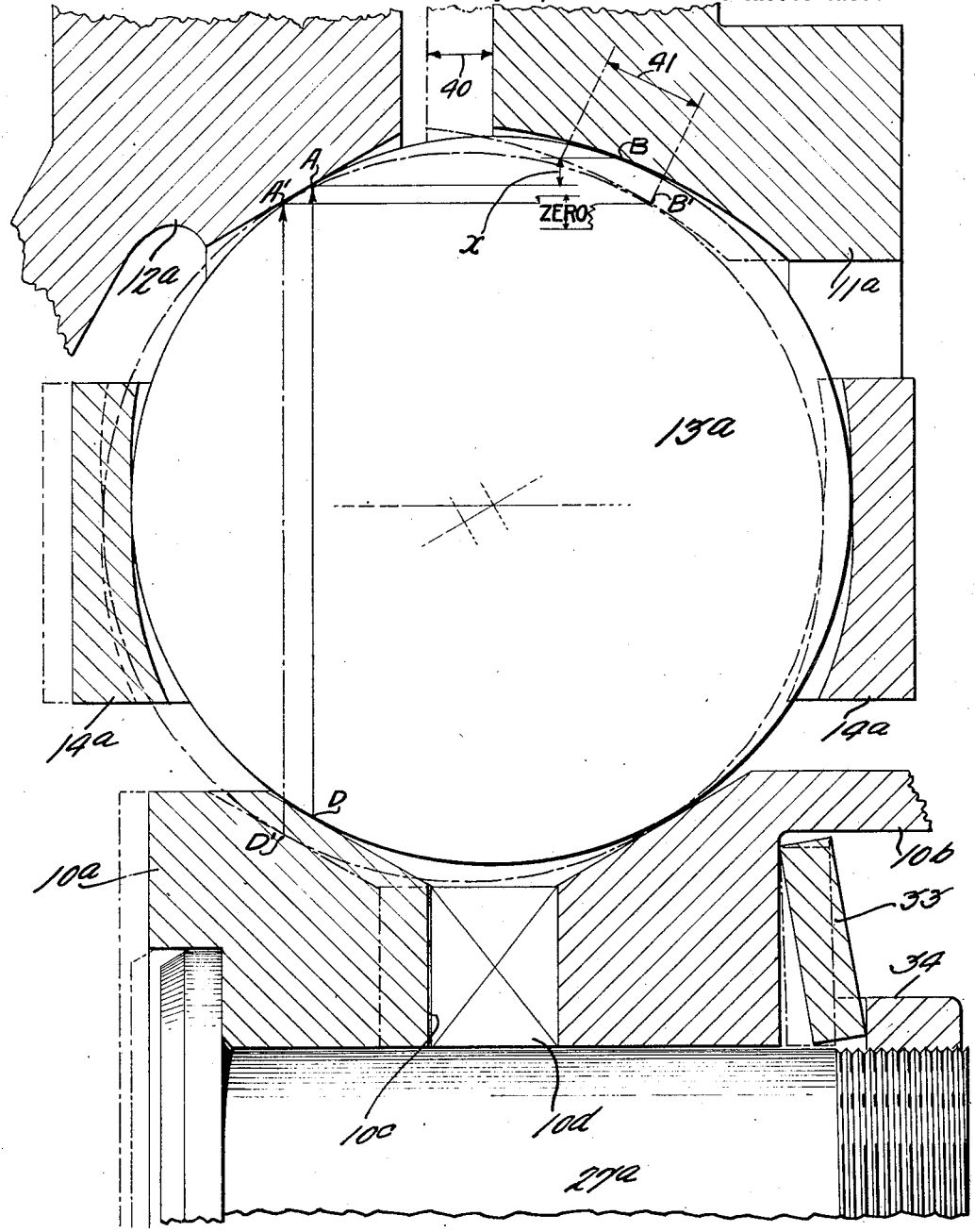
Figure 8 is a line diagram of the principal parts shown in Fig. 4.

As stated in the foregoing description of a single ratio form of this invention, the relative diameters of the paths of rolling contact (and hence the gear ratio) depends upon the relative angularity of the planet engaged surfaces of the members and the preferred variable ratio means of this invention should now be readily understood with reference to Figs. 4, 5 and 8, wherein the same numerals with an exponent added have been used to designate corresponding parts. To obtain a variable ratio, certain of the members have tracks of varying slope as indicated by the curved track of the fixed member $11^a$ in Fig. 8 and the members are made axially adjustable, for which purpose the driving member is divided into two axially movable sections $10^a$ and $10^b$ carrying mating splines $10^c$ and $10^d$ which constrain the sections against relative rotation.

The full lines of Fig. 8 show the driving members $10^a$ and $10^b$ in close-together position, members $11^a$ and $12^a$ being correspondingly separated, the resulting locations of planet contact being indicated at A, B and D. The difference in diameter of the corresponding rolling circles on the fixed member $11^a$ and the driven member $12^a$, indicated by the arrow X, giving a ratio of the order of 40/1 with the disposition shown. Separation of the drive members $10^a$ and $10^b$ and corresponding approach of the members $11^a$ and $12^a$ results in the position indicated by broken lines, contact being at A', B' and D', the former giving zero difference in the diameter of the contact paths, whereby the drive ratio is zero and the driving member $10^a$, $10^b$ may be rotated at any speed while the planets will hold the driven member $12^a$ stationary by equal rolling contact with that member and the fixed member $11^a$.

Pressure tending to close together the members $11^a$ and $12^a$ and so move the device towards the zero ratio position is opposed through the planets $13^a$ to pressure applied to bring the driving members $10^a$ and $10^b$ together and so reduce the ratio, and these pressures are respectively applied by the torque responsive anchorage of the member $11^a$ and a spring 33 acting on the member $10^a$ and $10^b$ through the drive shaft $27^a$ and adjusting nut 34. Thus the spring 33 and the driving load reactions from the anchor means of the member $11^a$ act in opposition, and when the spring overcomes the driving load reactions, the device will move to the highest driving speed condition which speed will be reduced as the driving load reactions overcome the spring.

By presetting the spring against a stop (as by bottoming of the splines $10^c$ and $10^d$) the gear may be adjusted to maintain full driving speed up to a preset load whereat the device will automatically move to the zero drive speed condition at which it will continue to exert the preset driving load and will automatically resume the driving movement whenever the resistance falls below the preset amount. The spring 33 may be proportioned and adjusted for any desired rate of change in ratio with increasing torque.

It is a special feature of this invention that under the zero ratio condition, the driving member may continue to rotate indefinitely whilst impressing a pre-determined driving force on the means to be driven and that no energy is absorbed until the driven means is moved. This is in contradistinction to the slipping clutch load regulating means of the single ratio showing wherein loss of power occurs at the clutch whenever that member slips, as when the driven means is slowed down below the speed due to the drive ratio.

It will be seen that there is slight rotational yield of the member 11ª to the driving force in producing the ratio controlling axial movement through the rolling of the balls 19 in their co-acting inclines, and it will be obvious that the automatic action of the device can be modified or overcome if desired by suitable external control means, such as a lever to control the rotational attitude of the member 11ª.

The torque responsive contact pressure means may be associated with any one of the drive members and in the case of external control the substitution of a second torque responsive means (not shown) in place of the spring 33, to balance the first such means shown, may be preferred. In either case this invention provides a large variation in gear ratio from a very small movement of the operated parts whereby powerful control forces may be manually applied.

In the specific disposition illustrated, the variation in diameter relation occurs between rolling paths on fixed and driven external members which disposition is suited to the high ratios needed for starters. The function of fixed, driving and driven members, however, may be transposed where different ranges of the gear ratio are desired. For instance, if one of the external members be the driver and the other the driven member and the central member be fixed, then zero contact diameter difference would result in unitary speed ratio. Also where higher driving speeds are required the external members may be organized as the driving means having unitary rotation, one part of the internal member being held and the other driven.

In the showing of Fig. 4 a shift means for the jaw 21ª comprises a manually operable shaft 31ª having a pin and groove connection with the jaw by which the same is axially shifted into engagement with an engine jaw 32ª.

In the foregoing, for ease of description, the driving member 10, 10ª, 10ᵇ has been shown as having two equal diameter paths of rolling contact with the planets, which are thereby constrained to spin about axes parallel to that of the driving member, and zero speed difference between the other members is in that case obtained when the contact circles thereon are of equal diameter as stated and shown in Fig. 3. The contact points on the driving member however, need not be in parallelism to the axis "X" thereof but may be on line "A" intersecting the axis as at 35 in the diagram of Fig. 9, and in such case the axis of spin "B" of the planets will be constrained to intersect the drive member axis at the same point, and zero speed difference between the other members will obtain when the line "C" through the planet contact points thereon also passes through the common intersection point. Any variation in the relative size of the contact circles from this common "apex" relation will cause the lines through the contact circles to intersect off the main axis and the speed ratio will vary with the amount of such displacement which is produced by axial movement between the races, as previously described.

It is pointed out in connection with Fig. 8 that to avoid confusion of the lines, the difference in curvature between the planet and the race of the member 11ª has been purposely exaggerated, which detracts from the amount of shift in the contact circles relative to the amount of control movement. The dimension indicated at 41, however shows that the shift of the contact path is greater than the movement of the member 11ª indicated at 40. With the actual closer formation of the track curvature to the planet profile (as practiced in ball bearing construction) the amount of control movement will be a smaller fraction of the resulting shift of the contact circle. This shift is itself slight in comparison with the relatively great resulting change in drive ratio and hence the required control movements are further reduced in accordance with one of the objects of this invention.

Obviously, the said device may be modified in detail without departing from the principle of the invention.

Having thus described my invention, I claim:

1. In apparatus of the class described the combination of an inner pair and an outer pair of axially separable concentric driving members, planetary means having rolling contact with each member, torque responsive means tending to close together one pair of members, spring means tending to close together the other pair of members in opposition to said torque responsive means.

2. In a friction drive, the combination of, an inner pair and an outer pair of axially separable drive members, common planet means having rolling contact with each member, and torque responsive contact pressure means adapted to change the driving ratio.

3. In a transmission, the combination of, planet members, annular members in rolling driving contact with said planet members and relatively movable to change the driving ratio, and torque responsive means adapted to enforce said contact and to control said movement.

4. In a planetary friction transmission, the combination of, members in rolling driving contact and relatively movable to decrease the driving ratio to infinity, and torque responsive means adapted to enforce said contact and to effect said movement automatically as the load increases.

5. In a transmission, the combination of planet members, annular members in friction driving rolling contact with said planet members and relatively movable to vary the drive ratio from zero to maximum, a yielding pressure means comprising a settable spring, and torque responsive means opposed to said pressure means and adapted to impose said contact and to automatically move the parts to zero ratio position when a load in excess of the spring setting is reached.

6. In a planetary transmission the combination of a fixed annulus, a driven annulus, torque responsive means tending to axially move together said annuli, a pair of axially approachable drive members, spring means tending to effect said approach in opposition to said torque responsive means, and planet members having rolling driving contact with said annuli and driving members.

7. A loading limiting friction transmission comprising planetary members in rolling driving contact and movable to a relation giving zero driving ratio, torque responsive means adapted to produce such movement, and spring means adapted to yield for such movement when the load limit is reached.

8. A yielding planetary friction transmission comprising in combination, an inner and an outer pair of axially separable concentric race members, one of said race members being anchored against rotation, planet means having driving rolling contact with each race member, said race members being contoured to afford variable radii of contacts with said planets including equal radii of contacts on the outer pair, a preset spring means tending to close together one pair of race members, torque responsive means tending to close together the other pair of members in opposition to said spring means towards said condition of equal contact radii with the planets whereby one pair of race members may continue to rotate without rotation of the un-anchored member of the other pair when a preset load is encountered.

Signed at Keyport, in the county of Monmouth and State of New Jersey, this 25th day of May, A. D. 1926.

ROLAND CHILTON.